(12) United States Patent
Gresty

(10) Patent No.: US 10,604,202 B1
(45) Date of Patent: Mar. 31, 2020

(54) ILLUMINATED FOOTBOARDS FOR A MOTORCYCLE

(71) Applicant: John Darren Gresty, Houston, TX (US)

(72) Inventor: John Darren Gresty, Houston, TX (US)

(*) Notice: Subject to any disclaimer, the term of this patent is extended or adjusted under 35 U.S.C. 154(b) by 0 days.

(21) Appl. No.: 16/197,316

(22) Filed: Nov. 20, 2018

(51) Int. Cl.
*F21V 33/00* (2006.01)
*B62J 6/00* (2020.01)
*B62J 25/00* (2020.01)
*B60Q 1/26* (2006.01)

(52) U.S. Cl.
CPC ............ *B62J 6/005* (2013.01); *B60Q 1/2696* (2013.01); *B62J 25/00* (2013.01); *B62J 2006/006* (2013.01)

(58) Field of Classification Search
CPC ...... B62J 6/005; B62J 25/00; B62J 2006/006; B60Q 1/2696
USPC ......................................................... 362/473
See application file for complete search history.

(56) References Cited

U.S. PATENT DOCUMENTS

| | | | |
|---|---|---|---|
| 5,702,172 A * | 12/1997 | Kilburn | B62J 6/001 340/432 |
| 6,398,393 B1 * | 6/2002 | Perse | B62J 6/04 362/390 |
| 6,592,242 B1 | 7/2003 | Scaccia | |
| 6,761,240 B1 | 7/2004 | Sollitto | |
| 7,585,095 B1 | 9/2009 | Sheriff | |
| 7,891,849 B2 * | 2/2011 | Campbell | B60Q 1/2661 362/473 |
| 8,864,349 B2 | 10/2014 | Aron | |
| 2007/0040665 A1 * | 2/2007 | Scott | B60Q 1/2657 340/468 |
| 2007/0210907 A1 | 9/2007 | Aron | |

* cited by examiner

*Primary Examiner* — Ali Alavi

(57) ABSTRACT

The invention is directed to illuminated footboards for a motorcycle. Two pairs of footboards are provided: front footboards for the operator, and rear footboards for a passenger. Both pairs of footboards provide a row of sequentially brightening yellow light emitting diodes (LEDs) on the side surfaces, which function as turn signals. The front footboards provide white light emitting diodes (LEDs) on the front surfaces similar to vehicle headlights, and the rear footboards provide brightening red LEDs on the rear surfaces which function as brake lights. Alternately, illuminated footpegs may provide single yellow LEDs on the ends as turn signals, and white LEDs on the front surfaces.

3 Claims, 3 Drawing Sheets

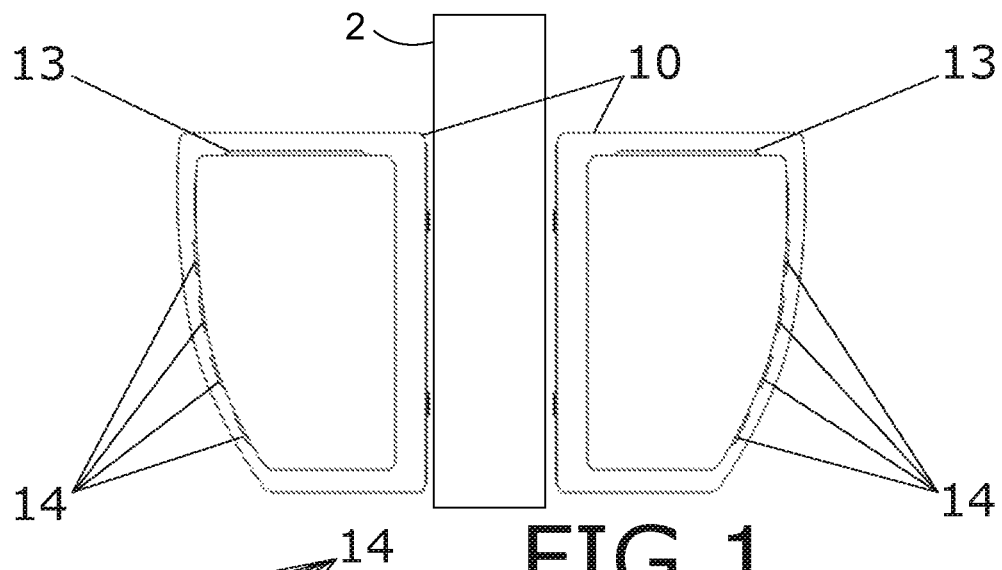
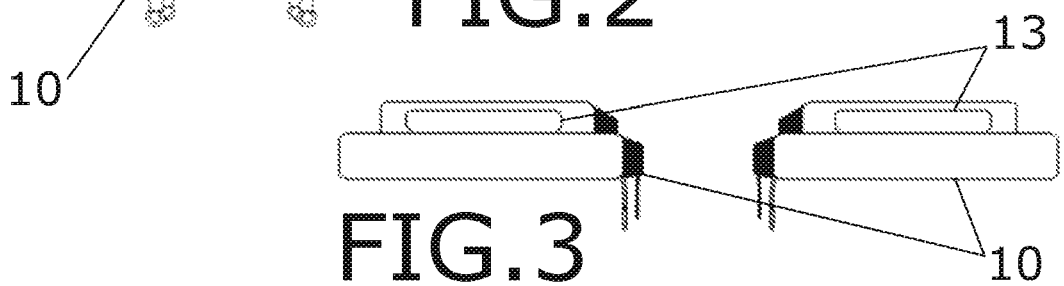
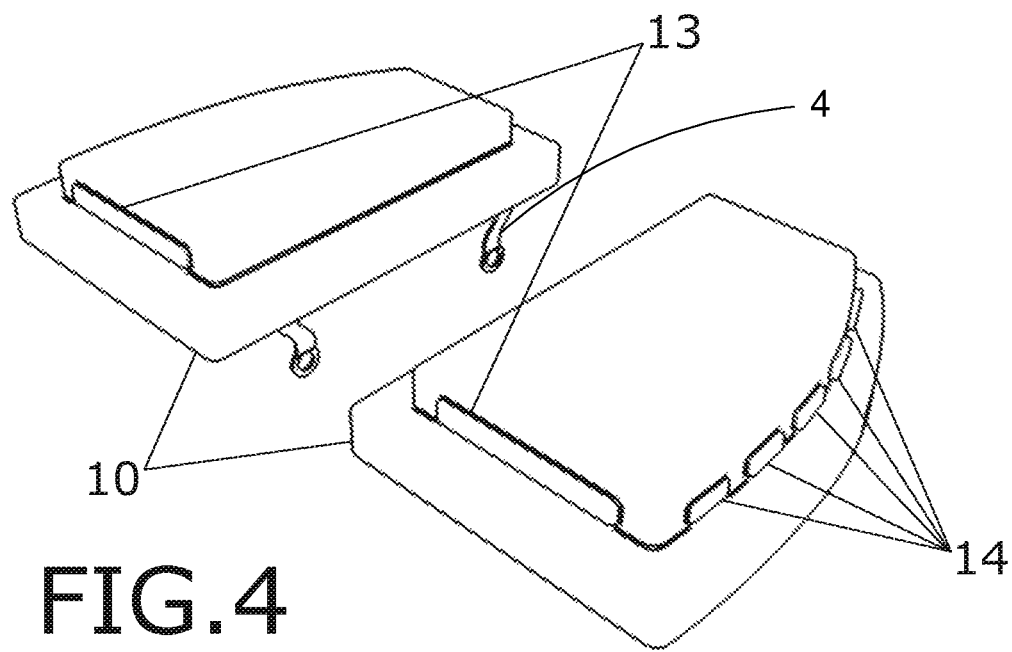

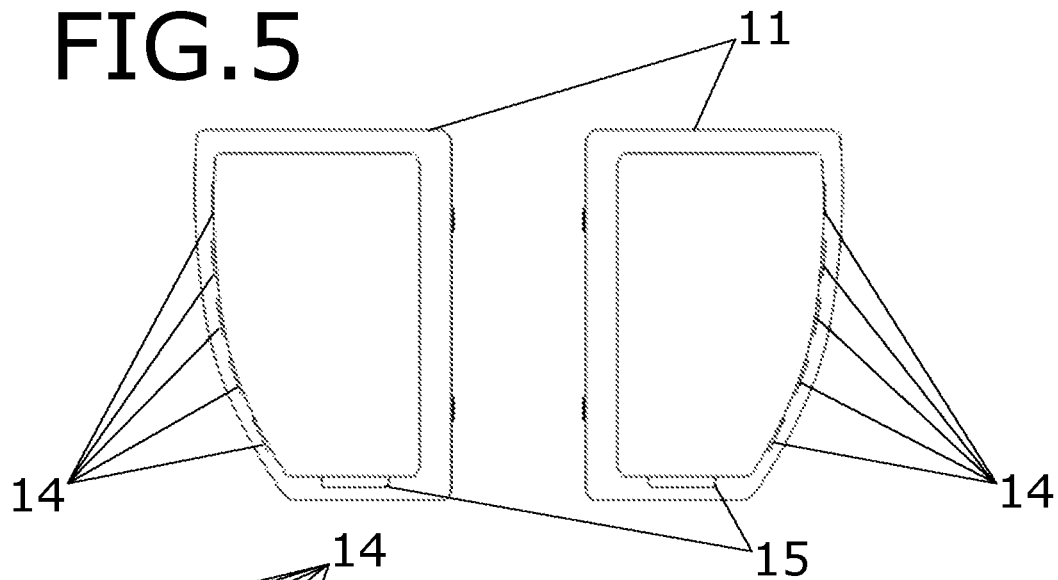
FIG.5
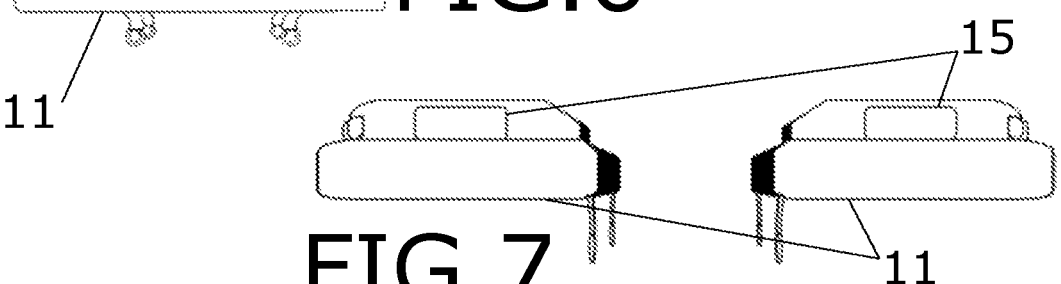
FIG.6
FIG.7
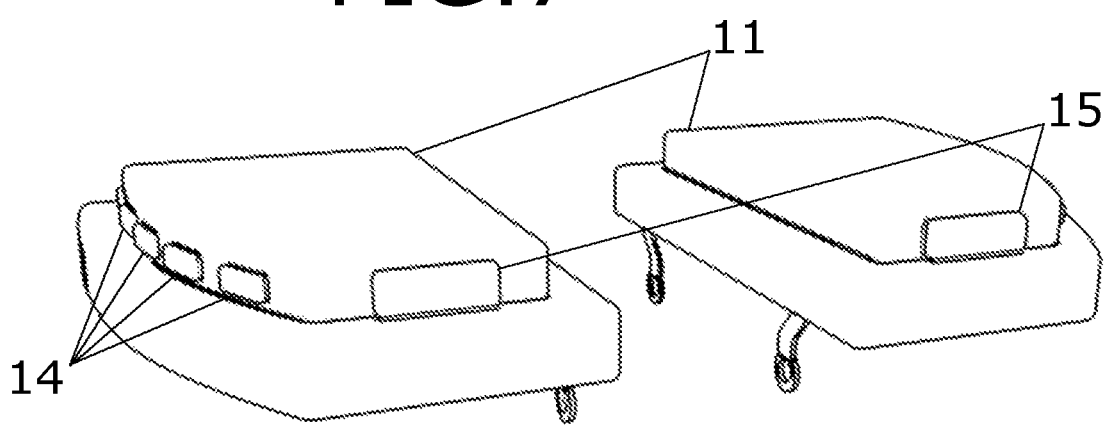
FIG.8

ILLUMINATED FOOTBOARDS FOR A MOTORCYCLE

This application relates back to, and claims the priority of Provisional Patent Application No. 62/589,490 filed on Nov. 21, 2017.

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention relates generally to motorcycle parts and accessories, and in particular to illuminated footboards for a motorcycle. On America's streets and highways, there are thousands of accidents involving motorcycles every year. The cyclists and their passengers are exceptionally vulnerable to injury compared to occupants of other vehicles, which are fully enclosed by a steel vehicle body. The drivers of other vehicles involved in these accidents often complain that they simply didn't see the motorcycles, particularly at night and in other conditions of reduced visibility.

A search of the prior art reveals various devices which have been developed to address this set of problems, or related problems. None are closely related to the present invention, but several include features which resemble those of the present invention. Each has proven to be less than satisfactory for the present purpose in its own way.

Illuminated motorcycle safety and vanity light bar, U.S. Pat. No. 7,585,095 (priority Aug. 26, 2008), provides an illuminated motorcycle safety and vanity light bar for conveying an illuminated identification or vanity message. The safety and vanity light bar for a motorcycle includes a light bar having an outwardly facing message surface area for illumination from an internal light source and a plurality of transparent optical apertures disposed upon the outwardly facing message surface area of the light bar. A message is displayed upon the message surface area and illuminated with illumination from the internal light source through the plurality of transparent optical apertures.

Illuminated motorcycle shifter linkage, U.S. Pat. No. 6,761,240 (priority May 16, 2002), provides an illuminated shifter linkage apparatus for coupling the shifter pedal and the transmission of a motorcycle includes an inner rod having a plurality of light-emitting elements seated within a corresponding set of inner rod apertures, and an open-ended outer hollow shaft into which the inner rod is received. When fully assembled, the light-emitting elements align with the corresponding apertures in the outer hollow shaft to facilitate the passage of light through the shaft apertures, thereby providing an aesthetically pleasing appearance and enhancing the visibility of the motorcycle at night and in poorly lit areas.

Illuminated motorcycle fairing element, U.S. Patent Appl. No. 2007/0210907 (priority Jun. 29, 2005), provides an illuminated motorcycle fairing element wherein in one embodiment, a trim element shaped as an elongated member is sized to fit adjacent to a motorcycle fairing and a motorcycle windshield. A plurality of light elements is coupled to the trim element, and at least one electrical connector communicates with at least one of the plurality of light elements. The electrical connector is structured to couple to a motorcycle wiring harness that provides electricity to illuminate the light elements. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

Illuminated motorcycle exhaust apparatus, U.S. Pat. No. 8,864,349 (priority Oct. 19, 2012), provides an illuminated motorcycle exhaust apparatus wherein in one embodiment, the illuminated motorcycle exhaust apparatus includes a light assembly housing sized to be removeably coupled to a distal end of a motorcycle exhaust. A thermally insulated light assembly is coupled to the light assembly housing, the thermally insulated light assembly is capable of providing a brake indicator function, a running light function, and a turn indicator function. An optional insertable motorcycle exhaust tip is sized to be removeably insertable into the light assembly housing so that a distal end portion of the motorcycle exhaust tip extends from the light assembly housing.

Auxiliary lights for a motorcycle, U.S. Pat. No. 6,592,242 (priority Mar. 29, 2002), provides a pair of auxiliary lights to be conveniently and unobtrusively carried at the opposite sides of a motorcycle in order to cooperate with the standard front headlamp and thereby advantageously provide the operator with a wide field of view including both frontal and lateral illumination so as to be better able to see approaching objects and landmarks and have sufficient time to react thereto. Each auxiliary light includes a housing, a light bulb enclosed by the housing and a foot peg bracket detachably connected to one side of the housing at which to receive a corresponding one of the left or right foot pegs of the motorcycle. A shifter mount bracket is detachably connected to the opposite side of the housing of one of the pair of auxiliary lights, and the gear shift pedal of the motorcycle is coupled to the shifter mount bracket of the one of the pair of auxiliary lights.

Any aftermarket modification which will increase visibility of a motorcycle under all visibility conditions, while maintaining a streamlined, stylish appearance, would be very useful and would be well received. Illuminated footboards for a motorcycle, which provide LED lights on all lateral surfaces in a conventional white, yellow, and red configuration, would resolve this problem.

SUMMARY OF THE INVENTION

Accordingly, the invention is directed to illuminated footboards for a motorcycle. Two pairs of footboards are provided: front footboards for the operator, and rear footboards for a passenger. Both pairs of footboards provide a row of sequentially brightening yellow light emitting diodes (LEDs) on the side surfaces, which function as turn signals. The front footboards provide white light emitting diodes (LEDs) on the front surfaces similar to vehicle headlights, and the rear footboards provide brightening red LEDs on the rear surfaces which function as brake lights. Alternately, illuminated footpegs may provide single yellow LEDs on the ends as turn signals, and white LEDs on the front surfaces.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated into and constitute a part of the specification. They illustrate two embodiments of the invention and, together with the description, serve to explain the principles of the invention.

FIG. 1 is a top view of the front footboards of the first exemplary embodiment, displaying the front footboards 10, the front LEDs 13, and the side LEDs 14.

FIG. 2 is a side view of a front footboard of the first exemplary embodiment, displaying the front footboard 10, and the side LEDs 14.

FIG. 3 is a front view of the front footboards of the first exemplary embodiment, displaying the front footboards 10, and the front LEDs 13.

FIG. 4 is a top perspective view of the front footboards of the first exemplary embodiment, displaying the front footboards 10, the front LEDs 13, and the side LEDs 14.

FIG. 5 is a top view of the rear footboards of the first exemplary embodiment, displaying the rear footboards 11, the side LEDs 14, and the rear LEDs 15.

FIG. 6 is a side view of a rear footboard of the first exemplary embodiment, displaying the rear footboard 11, and the side LEDs 14.

FIG. 7 is a rear view of the rear footboards of the first exemplary embodiment, displaying the rear footboards 11, and the rear LEDs 15.

FIG. 8 is a rear perspective view of the rear footboards of the first exemplary embodiment, displaying the rear footboards 11, the side LEDs 14, and the rear LEDs 15.

DETAILED DESCRIPTION OF THE INVENTION

Figure 9:
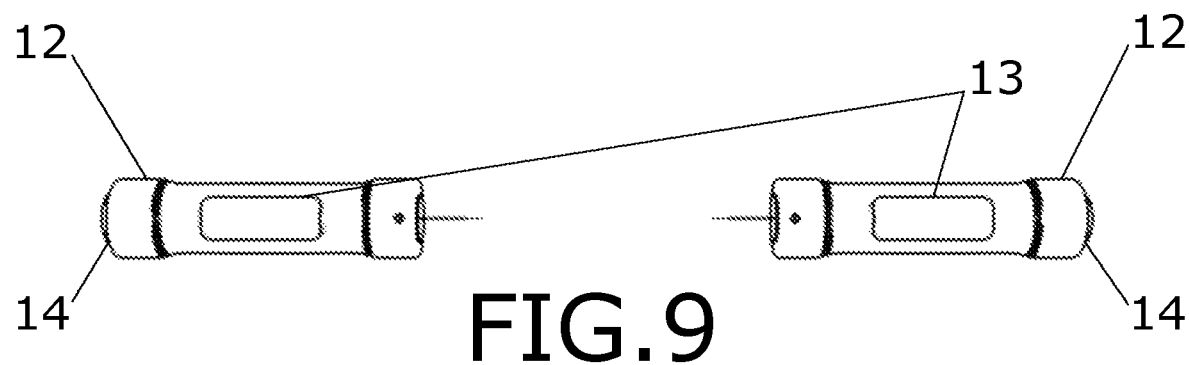
FIG. 9 is a front view of the second exemplary embodiment, displaying the footpegs 12, the front LEDs 13, and the side LEDs 14.
Figure 10:
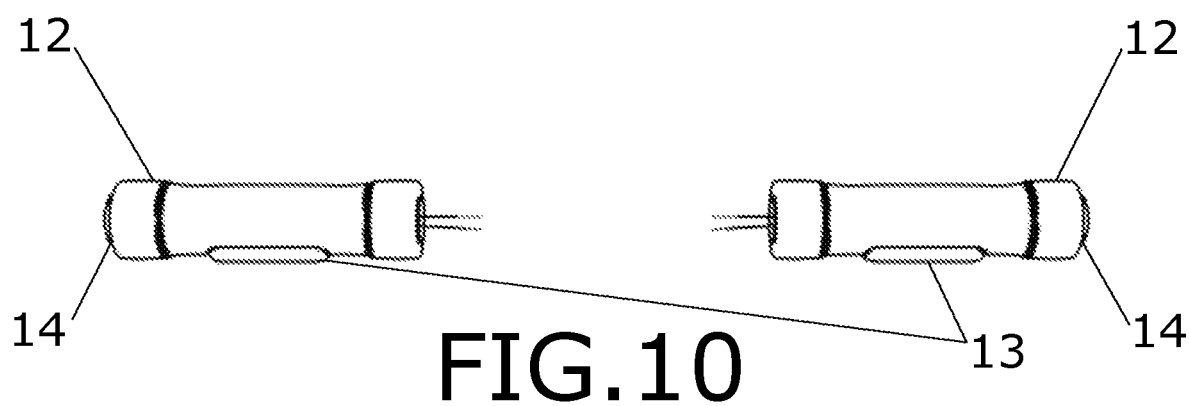
FIG. 10 is a top view of the second exemplary embodiment, displaying the footpegs 12, the front LEDs 13, and the side LEDs 14.
Figure 11:
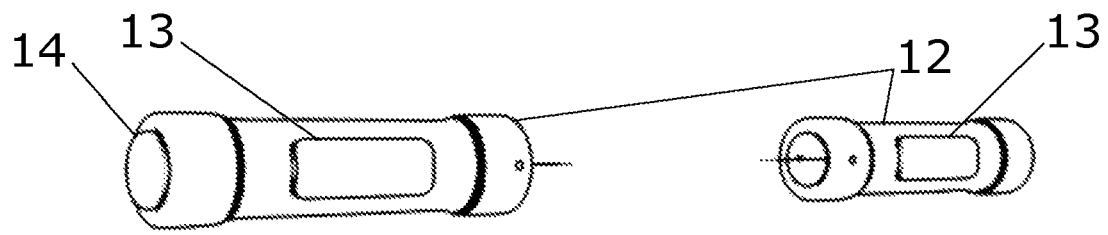
FIG. 11 is a side perspective view of the second exemplary embodiment, displaying the footpegs 12, the front LEDs 13, and the side LEDs 14.

Referring now to the invention in more detail, the invention is directed to illuminated footboards for a motorcycle.

The invention is intended for installation as an aftermarket modification by the owner of a motorcycle, a motorcycle dealer, or a repair or customizing shop. An alternate embodiment, intended for installation as original equipment by the manufacturer of the motorcycle, is contemplated.

The first exemplary embodiment is comprised of two front footboards 10 for use by the operator of a motorcycle 2, and two rear footboards 11 for use by a passenger. In most respects, the front footboards 10 and the rear footboards 11 are identical in structure and function to conventional motorcycle footboards. This description focuses on the features which differ from those found on conventional footboards.

Both pairs of footboards provide a row of sequentially brightening yellow light emitting diodes (side LEDs 14) on the side surfaces, which sequentially brighten when the turn signals of the motorcycle are activated. The side surfaces of the footboards are curved, making the side LEDs 14 fully visible through a 90° arc. Thus other drivers are provided a 90° view of the built-in turn signals provided by the side LEDs 14. The inner side and underneath the footboard includes straps 4 that may be used as well.

The front footboards 10 further provide white front LEDs 13 on the front surfaces similar to vehicle headlights, and the rear footboards 11 provide brightening red rear LEDs 15 on the rear surfaces which function as brake lights, brightening when the brakes of the motorcycle are applied. Preferably, the footboards are wired into, and draw electric power from, the electrical system of the motorcycle.

The second exemplary embodiment is comprised of footpegs 12 for use by the operator of a motorcycle. In most respects, the footpegs 12 are identical in structure and function to conventional motorcycle footpegs. This description focuses on the features which differ from those found on conventional footpegs.

The footpegs 12 provide white front LEDs 13 on the front surfaces similar to vehicle headlights, and brightening yellow side LEDs 14 on the ends, which brighten when the turn signals of the motorcycle are activated. Preferably, the footpegs 12 are wired into, and draw electric power from, the electrical system of the motorcycle.

To use the first or the second exemplary embodiment, the user installs the invention on the motorcycle and operates the invention in the same manner as conventional footboards or footpegs. Operation of the LEDs is automatic.

The front footboards 10, the rear footboards 11, and the footpegs 12 are preferably manufactured from rigid, durable materials, such as aluminum alloy, plastic, and steel, optionally coated with a flexible, durable material such as rubber or silicon. The front LEDs 13, the side LEDs 14, and the rear LEDs 15 are preferably manufactured from a rigid, durable material which is transparent, such as plastic. Components, component sizes, and materials listed above are preferable, but artisans will recognize that alternate components and materials could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

I claim:

1. A footboard for a vehicle that provides support for a user's foot, comprising:
    a board;
    a support surface positioned on top of the board and which has a shape that corresponds to a shape of the board, wherein the board and the support surface each have opposing front and rear sides and opposing inner and outer sides that are positioned in between the front and rear sides, wherein a diameter of the rear side is greater than a diameter of the front side, and wherein the outer side arcuately tapers from the rear side to the top side;

a series of light emitting diodes (LEDs) positioned on the outer side of the support surface, wherein the LEDs are positioned adjacently to the top of the board and the outer side;

a rear LED positioned on the rear side of the support surface, wherein the rear LED is positioned adjacently to the top of the board and the rear side; and a front LED positioned on the front side of the support surface, wherein the front LED is positioned adjacently to the top of the board and the front side, wherein the series of LEDs, rear LED, and front LED perform distinct lighting operations relative to each other, in which the rear LED shines brake lights responsive to a braking operation on the vehicle, the front LED shines headlights responsive to headlights being switched on for the vehicle, and the series of LEDs shine turning signals responsive to the vehicle activating a turning signal.

2. The footboard of claim 1, wherein the series of LEDs follow the arcuate shape of the outer side to enable greater view by other drivers.

3. The footboard of claim 1, further comprising straps positioned underneath and on an inner side of the board.

\* \* \* \* \*